United States Patent
Ward

[19]

[11] Patent Number: 6,131,429
[45] Date of Patent: Oct. 17, 2000

[54] SAFETY DEVICE FOR PRESS BRAKE

[76] Inventor: James C. Ward, 17511 Pope Dale Rd., Louisville, Ky. 40245

[21] Appl. No.: 09/248,305

[22] Filed: Feb. 11, 1999

[51] Int. Cl.$^7$ .............................. B21D 55/00; B21D 9/05; B21D 31/00
[52] U.S. Cl. .................................................. 72/1; 72/389.3
[58] Field of Search .............................. 72/1, 21.3, 389.3, 72/389.6; 192/129 R, 129 A, 129 B, 130, 131 R, 133, 134

[56] References Cited

U.S. PATENT DOCUMENTS

| | | |
|---|---|---|
| 1,084,897 | 1/1914 | Parkinson . |
| 2,337,143 | 12/1943 | Yanchenko . |
| 2,767,819 | 10/1956 | Cullerton, Jr. et al. . |
| 3,225,878 | 12/1965 | Estephanio . |
| 3,487,182 | 12/1969 | Grundy . |
| 3,866,004 | 2/1975 | Nawrocki . |
| 3,939,314 | 2/1976 | Loeser . |
| 4,030,364 | 6/1977 | Atwood ................................. 72/389.3 |
| 4,041,765 | 8/1977 | Kemper ................................. 72/389.3 |
| 4,044,445 | 8/1977 | Douri . |
| 4,060,160 | 11/1977 | Lieber . |
| 4,131,189 | 12/1978 | Stephens .............................. 72/389.3 |
| 4,166,369 | 9/1979 | Nakajima . |
| 4,174,663 | 11/1979 | Williams . |
| 4,220,032 | 9/1980 | Smith, Jr. . |
| 4,280,610 | 7/1981 | Meacham . |
| 4,321,841 | 3/1982 | Felix . |
| 4,395,641 | 7/1983 | Dise . |
| 4,489,578 | 12/1984 | Nagai et al. . |
| 4,699,260 | 10/1987 | Nieberding, Jr. . |
| 5,269,163 | 12/1993 | Yagi et al. . |

*Primary Examiner*—Rodney A. Butler
*Attorney, Agent, or Firm*—Middleton & Reutlinger; Charles G. Lamb

[57] ABSTRACT

A safety device for use on a press brake for forming a part between a die mounted on a lower frame of the press brake and a punch mounted on a moveable ram of the press brake. The safety device includes a gate pivotably mounted to the ram and a sensor mounted to the gate. The gate is pivotable between a guarded position and a retracted position, wherein the gate is in the guarded position when the punch is more than a preselected distance from the die, and wherein the gate is in the retracted position when the punch is less than the preselected distance from the die. The sensor is electrically connected to the press brake to suspend operation of the press brake upon actuation of the sensor when the gate is in the guarded position.

18 Claims, 10 Drawing Sheets

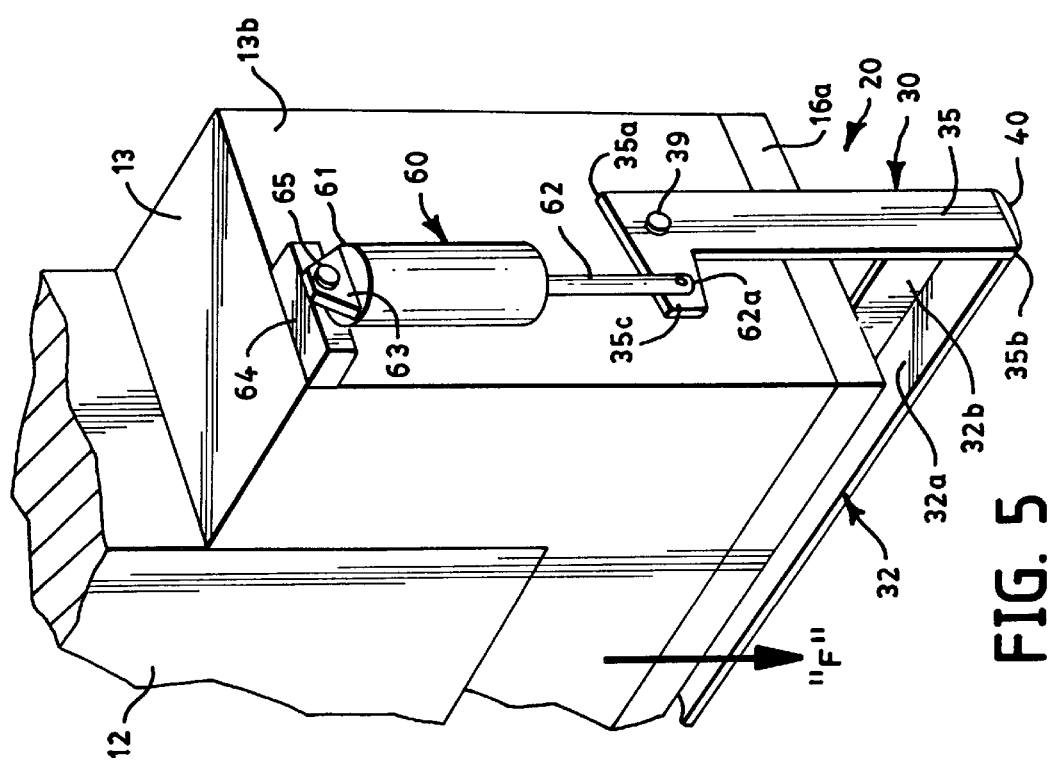
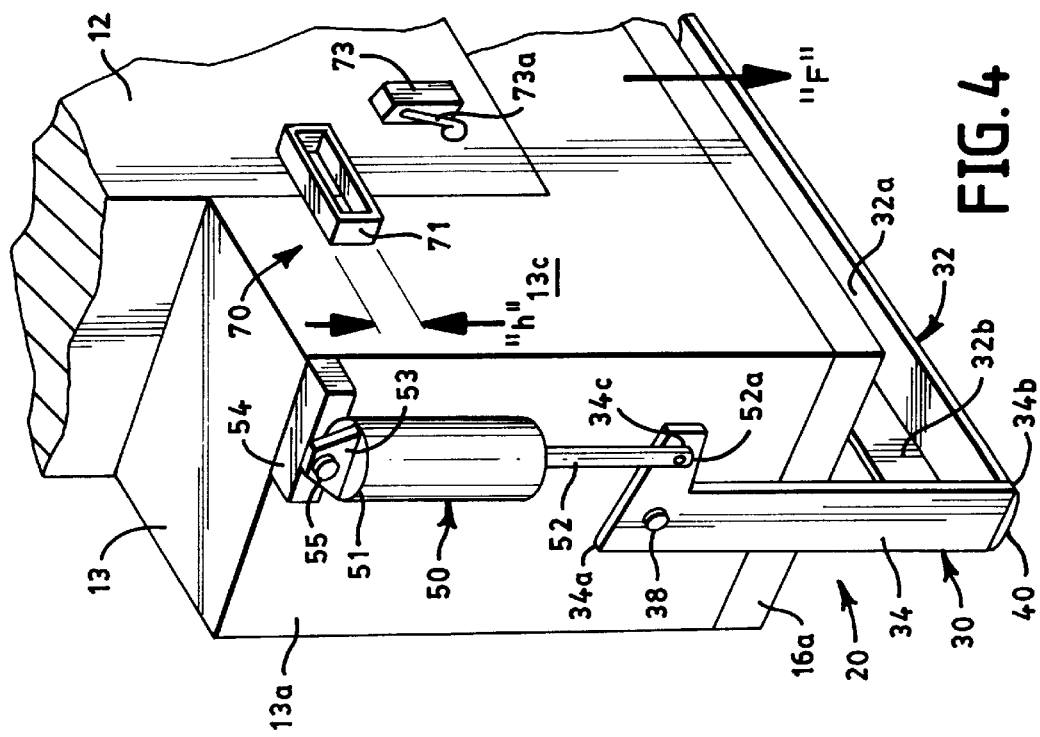

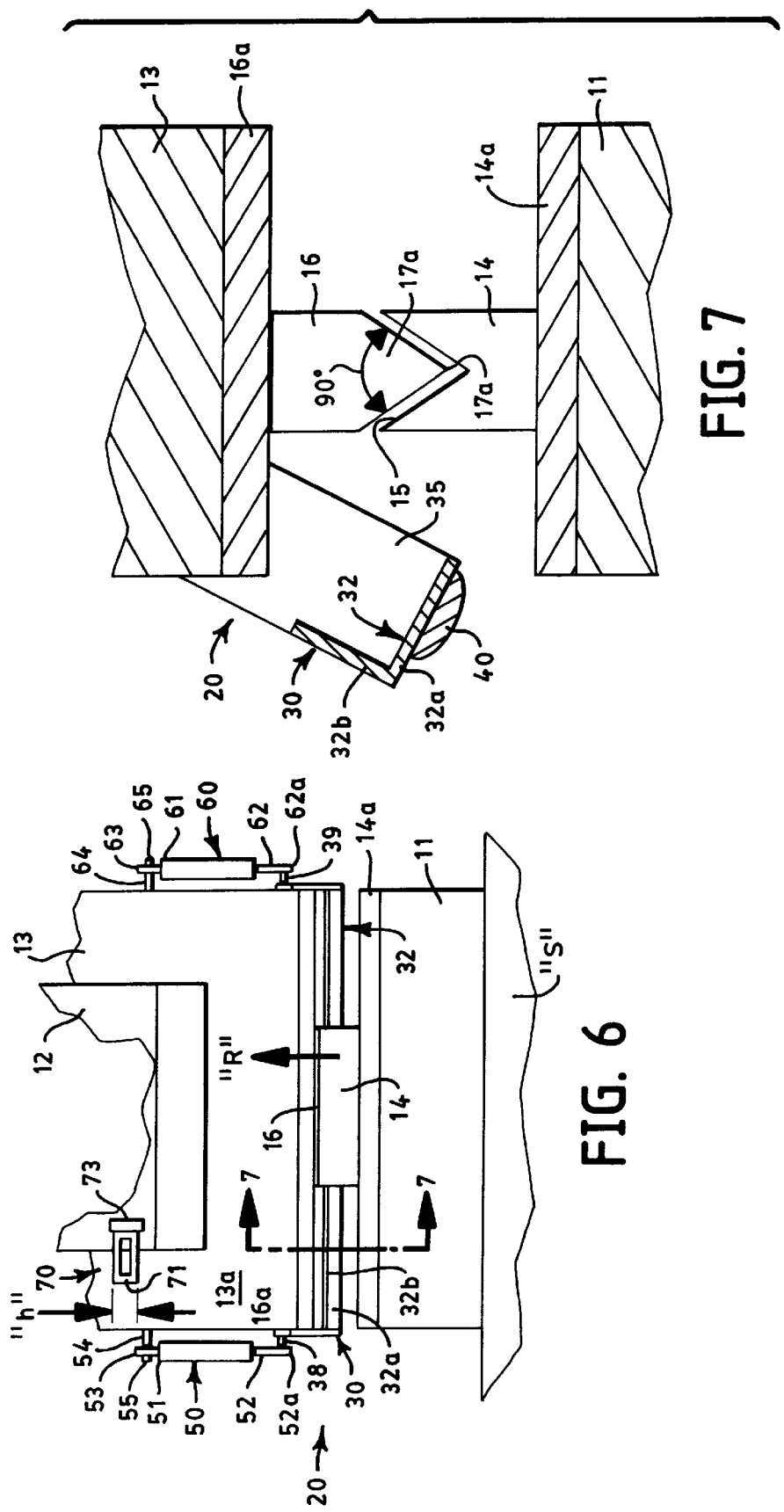

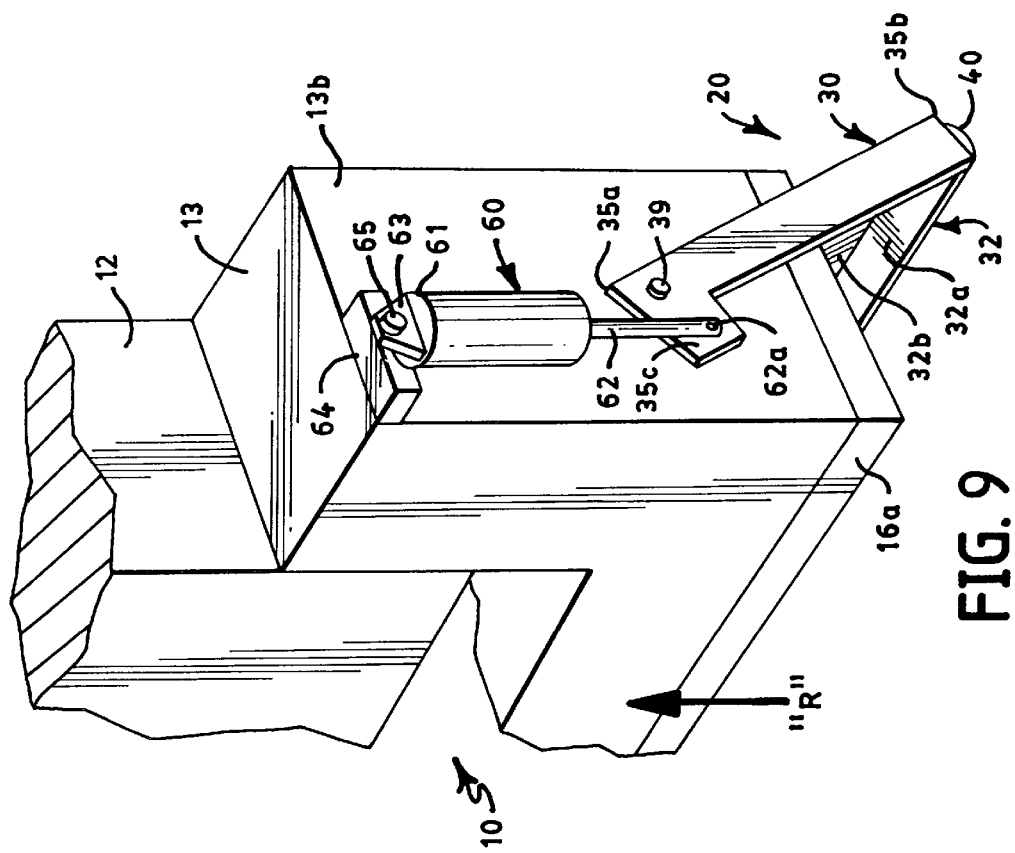
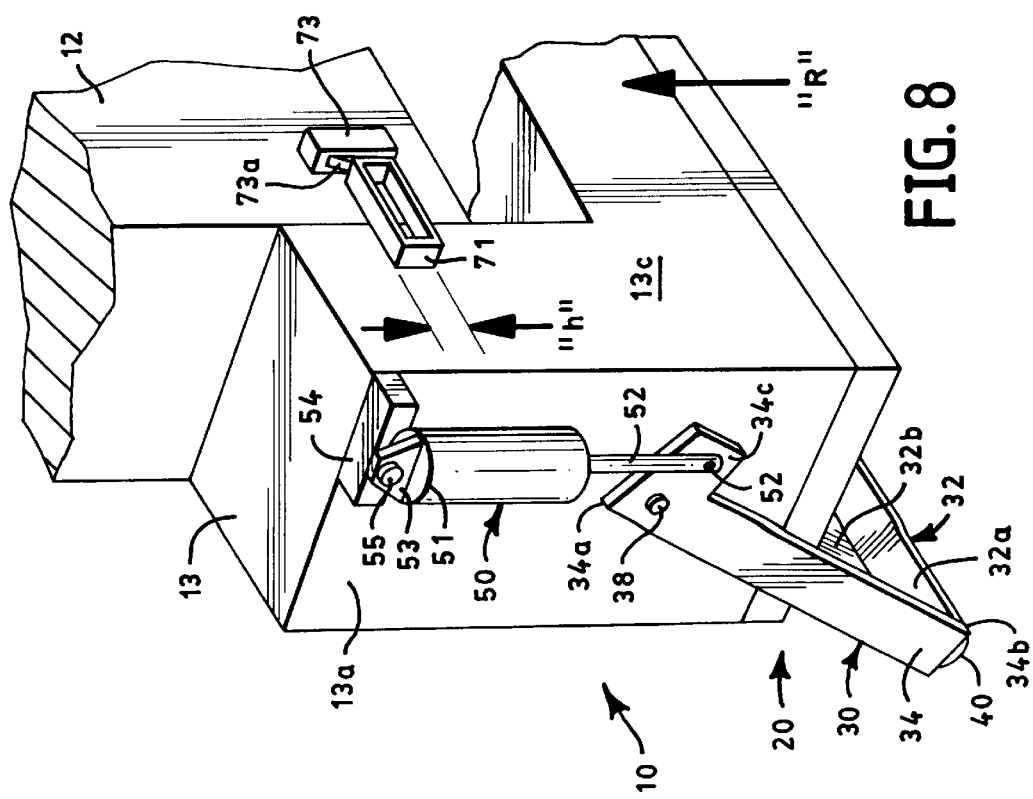

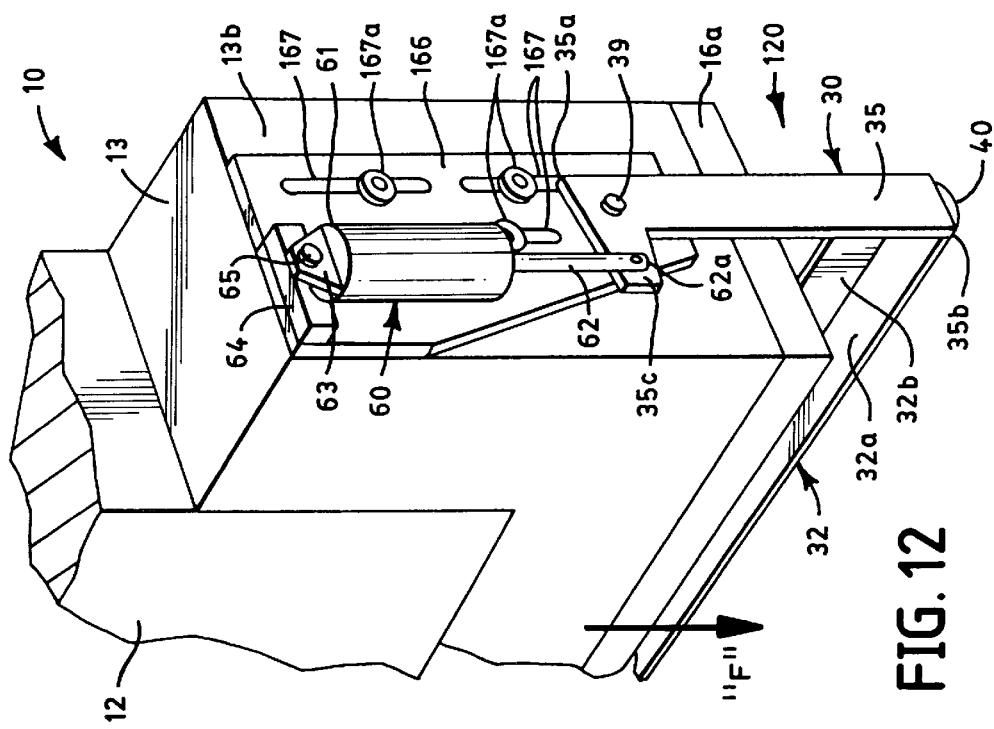
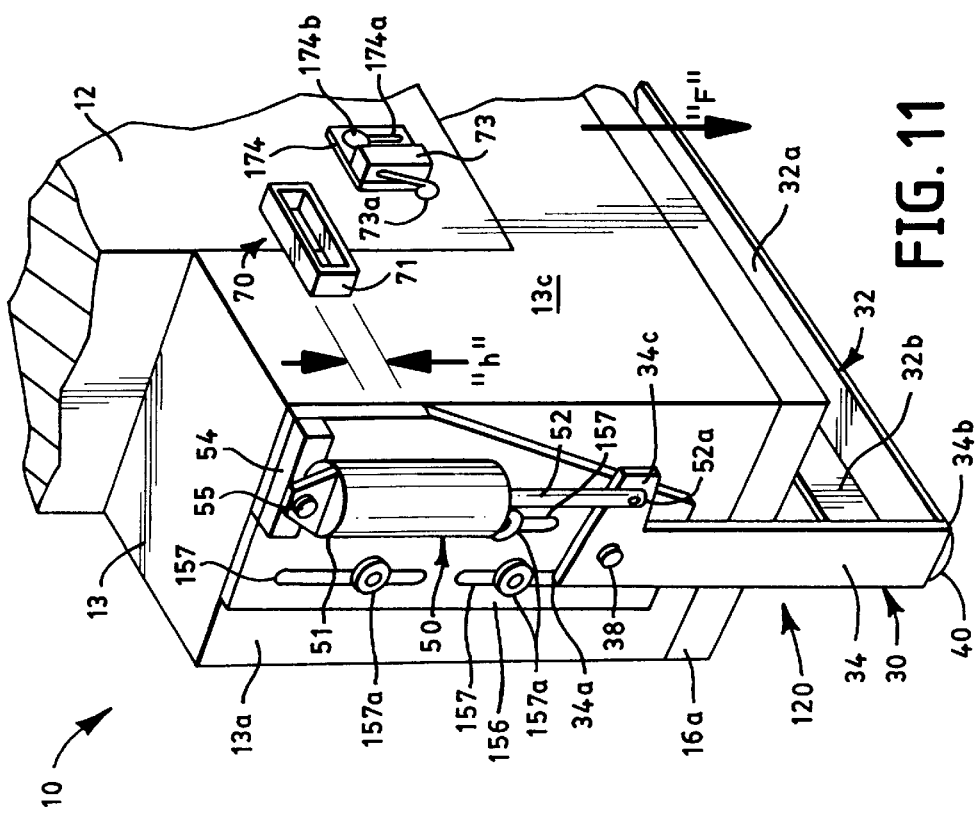

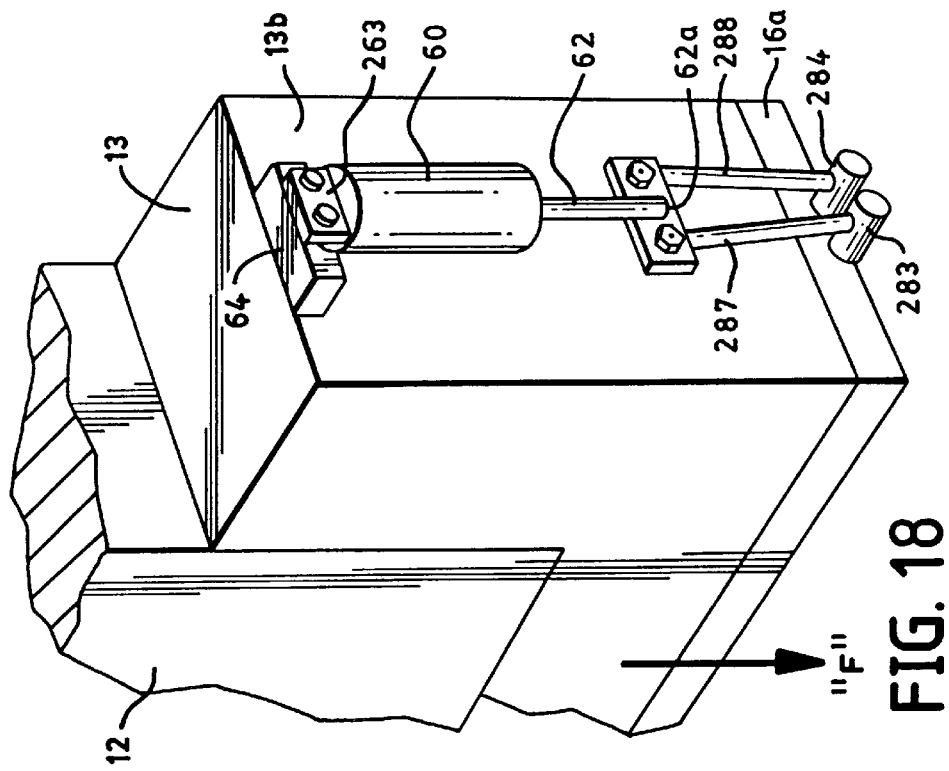
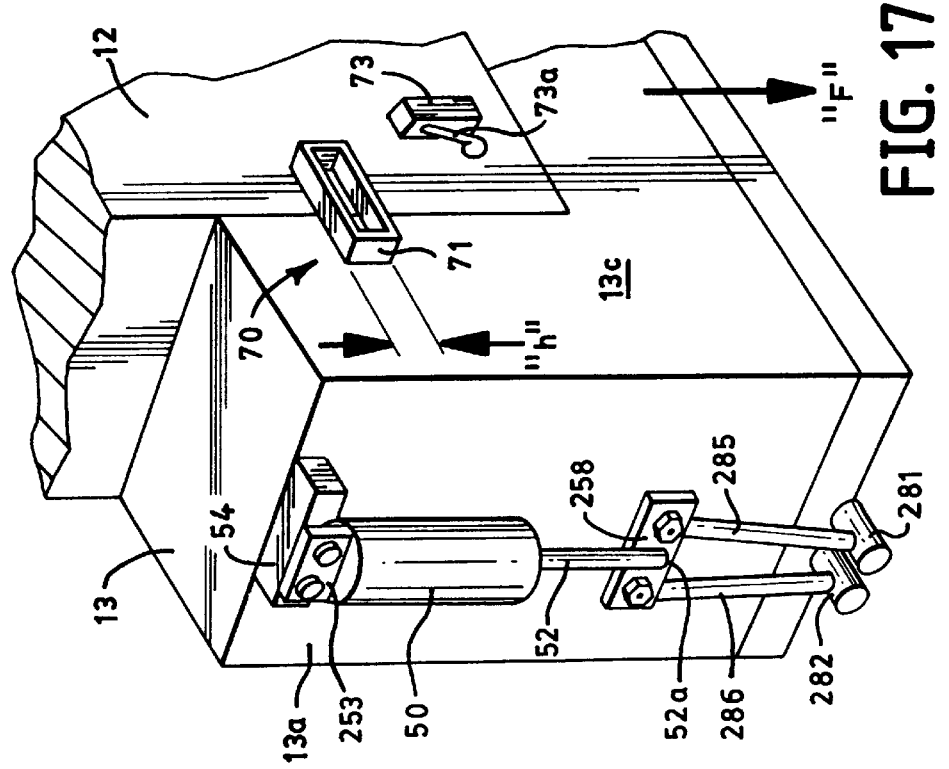

SAFETY DEVICE FOR PRESS BRAKE

BACKGROUND OF THE INVENTION

1. Technical Field of the Invention

The present invention relates to safety devices for press brakes. More particularly, the present invention relates to a safety device for a press brake, wherein the safety device is adapted to detect a foreign object within the press brake and to suspend operation of the press brake thereupon.

2. Description of the Related Art

Conventional press brakes are widely used in the prior art to bend, form or shape individual sheets of formable material, such as thin sheets of metal, into any number of useful shapes. For example, an "L"-shaped wall bracket may be formed by inserting a planar strip of sheet metal having a predetermined width, length and thickness into the press brake and manipulating the press brake in a suitable manner to bend the planar strip about an axis lying in the plane thereof and located at a predetermined location along its length.

A press brake typical of those found in the prior art includes an immobile frame having a die fixedly mounted thereto and a translatable ram having a punch fixedly secured thereto. The ram is attached to reversible driving means to permit sliding translation of the ram both in a first direction towards the frame and in a second direction away from the frame. The die and the punch are each sized, shaped and positioned relative to one another to permit the punch to be received by the die and to define the desired shape of a part formed thereby.

For example, and with reference back to the aforementioned "L"-shaped wall bracket, the press brake die may include an elongated upright "V"-shaped channel and the punch may include a cooperating upright elongated "V"-shaped downward projection, wherein the punch projection is sized to be received by the die channel. The "L"-shaped bracket is formed by an operator manually positioning the planar strip of formable material between the frame die and the ram punch, such that the planar strip lies in the path along which the ram punch travels to be received by the frame die. The ram punch contacts the planar sheet and forces it into the frame die, thereby pinching the planar strip between the ram punch and the frame die and forming the shape of the planar strip according to the engagement therebetween.

To those skilled in the art, it is known that the ram punch and the frame die oftentimes define a pinch point therebetween, thereby presenting a safety hazard to an operator thereof, who is oftentimes required to hold the planar strip in position between the ram punch and the frame die until such time as the planar strip is pinched and gripped thereby. As such, a portion of the operator's body, and more typically, the operator's hand or fingers, may be accidentally injured thereby. Various safety devices have been taught by the prior art which provide a means by which operation of the press brake is suspended in the event a foreign object, such as the operator's hand, is placed in the path along which the ram punch travels to be received by the frame die. Thus, it is desirable to provide a safety device for a press brake, wherein the risk of operator injury from the press brake is minimized thereby. It is furthermore desirable to provide a safety device for a press brake, wherein operation of the press brake is suspendable in the event a foreign object is placed therein.

For example, U.S. Pat. No. 4,166,369 to Nakajima teaches a safety device for a press brake wherein a fixed vertical curtain of light beams enclose a region of the press brake surrounding a slide portion and a lower beam portion, wherein the slide and the lower beam cooperate to define a pinch point therebetween. As the slider moves downwardly towards the lower beam, each vertically successive light beam is deactivated immediately prior to its being interrupted by the moving slider. Interruption of any of the lights beams prior to deactivation by the position of the slider, for example, when the operator places his hand in the path of the light beam, suspends movement of the slider, thereby minimizing the risk that an operator's hand may be caught in the pinch point and injured thereby. However, it is furthermore desirable to provide a safety device for use on a press brake, wherein the safety device is attachable to a moveable portion of the press brake. It is also desirable to provide a safety device for use on a press brake, wherein an operator thereof is permitted to access a region of the press brake surrounding the pinch point thereof while the ram is positioned more than a predetermined activation distance from the frame. It is even further desirable to provide a safety device for use on a press brake, wherein movement of the part being formed by the press brake does not interfere with operation thereof.

SUMMARY OF THE INVENTION

The present invention is for a safety device for use on a press brake, wherein the safety device is adapted to suspend operation of the press brake in the event a foreign object is inserted therein. A safety device according to a preferred embodiment of the present invention includes a sensor attached to a ram portion of the press brake and moveable between a guarded position and a retracted position, wherein the guarded position lies substantially in the path along which the ram travels while translating in a first direction towards a frame portion of the press brake, and wherein the retracted position lies substantially away from the path along which the ram travels towards the frame portion of the press brake.

The sensor is moved from the guarded position to the retracted position, and then from the retracted position to the guarded position, upon the ram reaching a predetermined activation distance from the frame. That is, the sensor remains in the guarded position while the ram is in a position relative to the frame by a distance greater than the predetermined activation distance, and the sensor remains in the retracted position while the ram is in a position relative to the frame by a distance less than the predetermined activation distance. Actuation of the sensor while in the guarded position automatically suspends further movement of the ram towards the frame.

In the preferred embodiment, the sensor is a conventional tape switch mounted to an elongated gate pivotably mounted at opposing ends thereof to the ram portion of the press brake. While in the guarded position, the gate is located immediately forward of the leading edge of a punch portion of the ram. Upon the ram's reaching the predetermined activation distance, the gate is pivoted from the guarded position to the retracted position by one or more activation cylinders. While in the retracted position, the gate is located outwardly from the punch portion of the ram, thereby permitting the punch portion of the ram to be received by a die portion of the frame and to bend a formable part positioned by the operator therebetween.

It is an object of the present invention to provide a safety device for a press brake, wherein the risk of operator injury from the press brake is minimized thereby. It is another object of the present invention to provide a safety device for a press brake, wherein operation of the press brake is suspendable in the event a foreign object is placed therein.

It is yet another object of the present invention to provide a safety device for use on a press brake, wherein the safety device is attachable to a moveable portion of the press brake. It is still another object of the present invention to provide a safety device for use on a press brake, wherein an operator thereof is permitted to access a region of the press brake surrounding the pinch point thereof while the ram is positioned more than a predetermined activation distance from the frame. It is even further object of the present invention to provide a safety device for use on a press brake, wherein movement of the part being formed by the press brake does not interfere with operation thereof.

A safety device for use on a press brake for forming a part between a die mounted on a lower frame of the press brake and a punch mounted on a moveable ram of the press brake. The safety device includes a gate pivotably mounted to the ram and a sensor mounted to the gate. The gate is pivotable between a guarded position and a retracted position, wherein the gate is in the guarded position when the punch is more than a preselected distance from the die, and wherein the gate is in the retracted position when the punch is less than the preselected distance from the die. The sensor is electrically connected to the press brake to suspend operation of the press brake upon actuation of the sensor when the gate is in the guarded position.

BRIEF DESCRIPTION OF THE DRAWINGS

A better understanding of the present invention will be had with reference to the following description, in conjunction with the accompanying drawings, in which like numerals refer to like parts, and wherein:

FIG. 4 is a detail perspective view of the press brake and safety device of FIG. 1, wherein a first side end of the press brake is shown;

FIG. 5 is a detail perspective view of the press brake and safety device of FIG. 1, wherein a second side end of the press brake is shown;

FIG. 6 is a front elevation view of the press brake and safety device of FIG. 1, wherein the press brake ram portion is shown in a second position, and wherein the safety device is shown in a retracted position;

FIG. 7 is a section view of the press brake and safety device of FIG. 6, shown along section line 7—7 of FIG. 6;

FIG. 8 is a detail perspective view of the press brake and safety device of FIG. 6, wherein a first side end of the press brake is shown;

FIG. 9 is a detail perspective view of the press brake and safety device of FIG. 6, wherein a second side end of the press brake is shown;

FIG. 11 is a detail perspective view of the press brake of FIG. 1, shown with a safety device according to an alternative embodiment of the present invention shown affixed thereto, wherein a first side end of the press brake is shown;

FIG. 12 is a detail perspective view of the press brake and safety device of FIG. 11, wherein a second side end of the press brake is shown;

FIG. 17 is a detail perspective view of the press brake and safety device of FIG. 13, wherein a first side end of the press brake is shown; and, FIG. 18 is a detail perspective view of the press brake and safety device of FIG. 13, wherein a second side end of the press brake is shown.

DETAILED DESCRIPTION OF THE PREFERRED EMBODIMENTS

Figure 1:
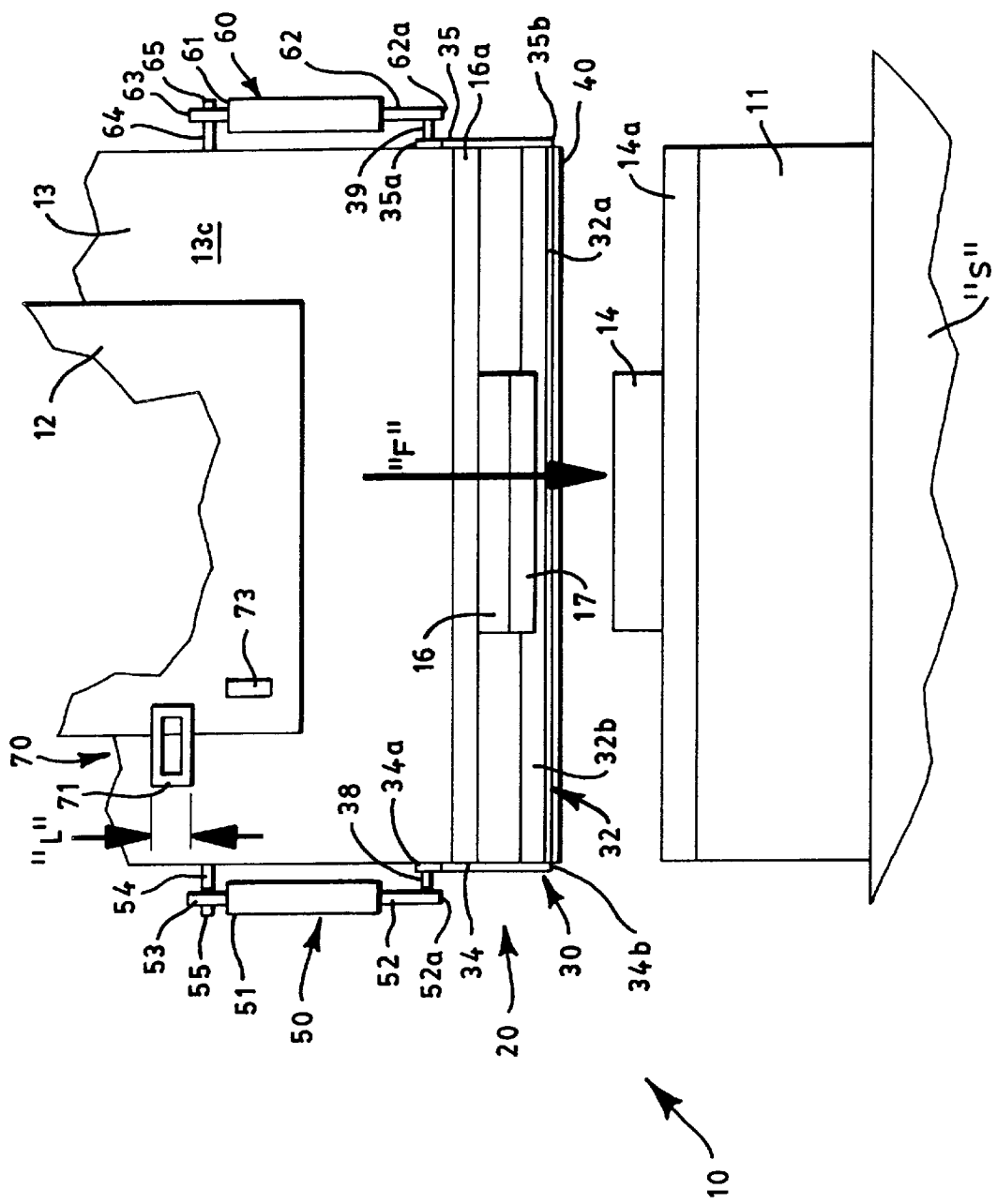
FIG. 1 is a front elevation view of a press brake having a safety device according a preferred embodiment of the present invention affixed thereto, wherein a ram portion of the press brake is shown in a first position, and wherein the safety device is shown in a guarded position.

With reference to FIG. 1, a press brake 10 is shown having a safety device 20 according to a preferred embodiment of the present invention affixed thereto. More particularly, the press brake 10 includes an immobile lower frame 11 fixedly secured to a rigid structure such as a machine-shop floor, denoted generally in the Figures by reference letter "S". The press brake 10 further includes an upper frame 12 fixedly secured to, and forming an integral construction with, the lower frame 11. A translatable ram 13 is provided in slidable relation with the upper frame 12 and is attached to reversible driving means (not shown) to permit controlled, sliding translation of the ram 13 both in a first direction towards the lower frame 11 (denoted generally in the Figures by reference letter "F") and in a second direction away from the lower frame 11 (denoted generally in the Figures by reference letter "R"). Alternatively, the ram 13 may be stationary and the lower frame 11 may be translatable, in which case, the lower frame 11 will move upwardly towards or away from the ram 13.

For example, the reversible ram driving means may be a mechanical driving system having a flywheel, flywheel driving means, a clutch and a brake. Alternatively, the reversible ram driving means may be a hydraulic driving system having one or more hydraulic cylinders connected to a source of pressurized hydraulic fluid.

The ram 13 is translatable between a first position, such as is generally shown in FIG. 1, wherein the ram 13 is spaced from the lower frame 11 by a sufficient distance to permit an operator to insert a part, for example, a planar strip of formable material such as ductile metal, to be formed thereby therebetween, and a second position, such as is generally shown in FIG. 6, wherein a portion of the ram 13 engages a portion of the lower frame 11 as hereinbelow described.

Figure 3:
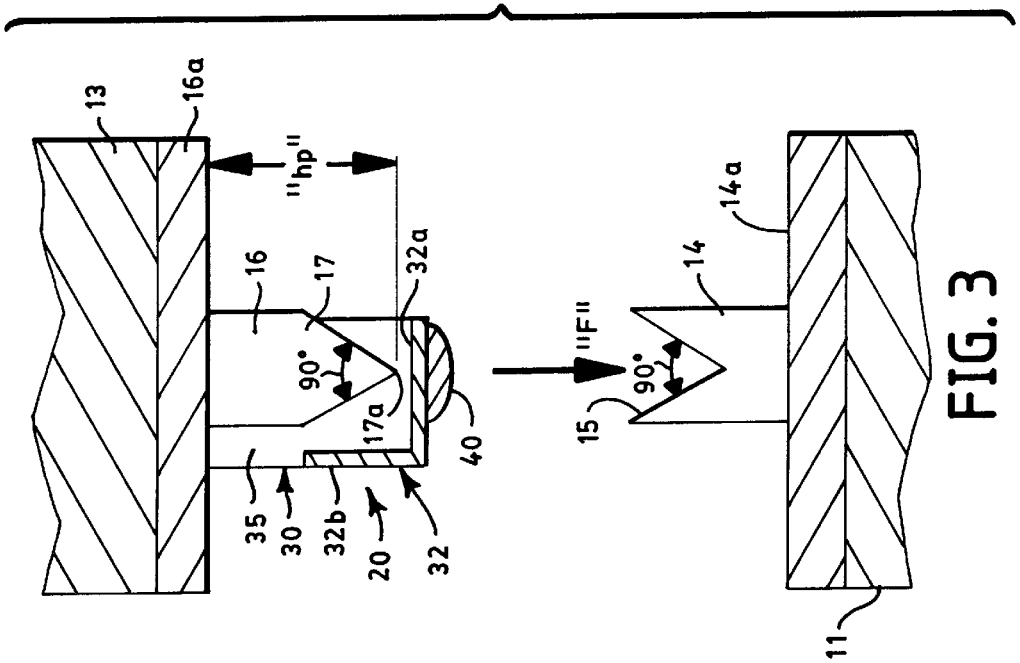
FIG. 3 is a section view of the press brake and safety device of FIG. 1, shown along section line 3—3 of FIG. 2.
Figure 2:
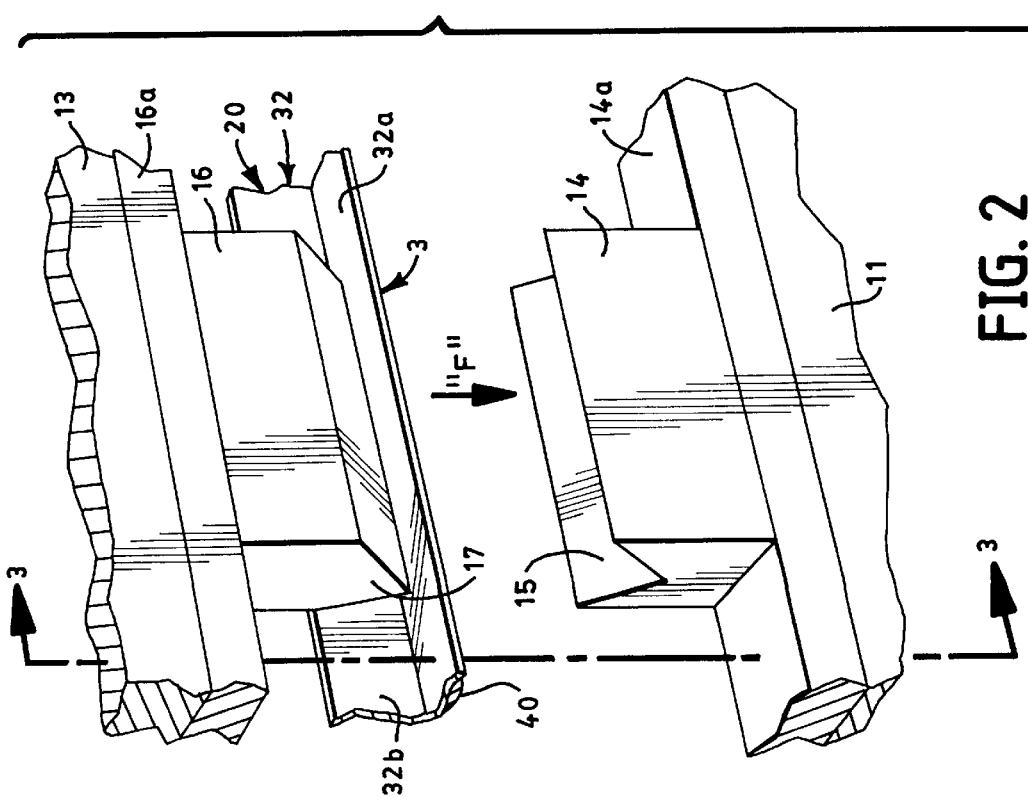
FIG. 2 is a detail perspective view of the press brake and safety device of FIG. 1, wherein a region surrounding a pinch point thereof is shown.

With additional reference to FIGS. 2 and 3, the lower frame 11 includes at least one die 14 removably affixed thereto, for example, by a mounting plate 14a to which the die 14 is fixedly secured and which is itself secured to the lower frame 11 by, for example, bolts (not shown) or other similar removable attachment means. Alternatively, the die 14 may be removably affixed to the mounting plate 14a by, for example, bolts (not shown) or other similar removable attachment means, or may be removably affixed directly to the lower frame 11 by, for example, bolts (not shown) or other similar removable attachment means. Alternatively still, the die 14 may be clamped between two opposing vertical plates (not shown) adjustably mounted to the lower frame 11.

The die 14 includes a channel portion 15 thereof which is sized and shaped according to the desired shape of the part which is to be formed thereby. For example, where is it desired to bend the substantially planar sheet of formable material into an "L"-shaped wall bracket, the die channel 15 may have a substantially upright elongated "V"-shaped cross-section, wherein opposing surfaces thereof form an interior angle therebetween of approximately 90°. Although the die 14 is shown in the Figures to have sharp corners and substantially planar surfaces, it is to be understood that variations in the geometry thereof may be made without departing from either the spirit or the scope of the present invention. That is, the die channel 15 may define any number of surfaces or shapes thereby, such as a substantially concave surface suitable for forming a rounded part thereby.

The ram 13 includes at least one punch 16, and more particularly, one punch 16 for each die 14, removably affixed thereto, for example, by a mounting plate 16a to which the punch 16 is fixedly secured and which is itself secured to the ram 13 by, for example, bolts (not shown) or other similar removable attachment means. Alternatively, the punch 16 may be removably affixed to the mounting plate 16a by, for example, bolts (not shown) or other similar removable attachment means, or may be removably affixed directly to the ram 13 by, for example, bolts (not shown) or other similar removable attachment means. Alternatively still, the punch 16 may be clamped between two opposing vertical plates (not shown) adjustably mounted to the ram 13.

The punch 16 includes a substantially upright elongated "V"-shaped downward projection 17 which is sized and shaped to be receivable by the die channel 15 and to shape the formable material therebetween. Although the punch 16 is shown in the Figures to have sharp corners and substantially planar surfaces, it is to be understood that variations in the shape thereof may be made without departing from either the spirit or the scope of the present invention. That is, the punch 16 may define any number of surfaces or shapes thereby, such as a substantially convex surface suitable for forming a rounded part thereby.

With additional reference to FIGS. 4 and 5, the safety device 20 includes an elongated gate 30 pivotably mounted at distal ends thereof to opposing first and second side ends 13a, 13b, respectively, of the ram 13, wherein the gate 30 is pivotably moveable between a guarded position, such as is shown in FIGS. 4 and 5, and a retracted position, such as is shown in FIGS. 8 and 9. Although it is preferred that the gate 30 pivots between the guarded position and the retracted position as described herein, the gate 30 may alternatively follow any path between the guarded position and the retracted position. For example, the gate 30 may slidingly translate along a substantially linear path between the guarded position and the retracted position.

The gate 30 includes an elongated face member 32 having a substantially upright "L"-shaped cross-section. When the gate 30 is in the guarded position, a substantially horizontal portion 32a of the face member 32 projects forwardly and is spaced vertically below the leading edge 17a of the punch 17 by approximately ¼-inch, or slightly less than the thickness of the smallest finger of an average-sized and proportioned operator.

A sensor 40 is fixedly secured to an underside surface of the horizontal portion 32a of the face member 32, substantially along its entire length, and is electrically coupled to the reversible driving means of the ram 13 as hereinbelow described. The sensor 40 is preferably a contact-sensitive tape switch which is actuated upon depressing a portion thereof at any point along its length. For example, the sensor 40 may be any one of the type of ribbon sensing tape switches manufactured and sold by Tapeswitch Corporation of Farmingdale, N.Y., under the registered trademark "Controflex". The sensor 40 must have sufficient sensitivity to permit actuation thereof by a force which is less than a compressive force which will typically cause injury to an average human finger.

The gate 30 is pivotably connected at either end thereof to the ram 13 by first and second arms 34, 35, respectively. An upper end 34a of the first arm 34 is pivotably connected to the first side end 13a of the ram 13, for example, by a first pin 38, which permits substantially unrestricted pivotal movement of the first arm 34 thereabout. An upper end 35a of the second arm 35 is pivotably connected to the second side end 13b of the ram 13, for example, by a second pin 39, which permits substantially unrestricted pivotal movement of the second arm 35 thereabout. The first and second pins 38, 39, respectively, are preferably coaxial. A lower end 34b of the first arm 34 is fixedly secured to a first distal end of the face member 32 and a lower end 35b of the second arm 35 is fixedly secured to a second distal end of the face member 32 such that the first arm 34, the second arm 35 and the face member 32 form a unitary construction which is capable of integrally pivoting about the axis of the first and second pins 38, 39, respectively, vertically below a lower end of the ram 13, and more particularly, vertically below the leading edge 17a of the die projection 17, and spaced therefrom preferably by the aforementioned ¼-inch spacing.

The gate face member 32 includes a substantially vertical portion 32b being integral with, and projecting upwardly from, a rear lateral edge of the horizontal portion 32a. The vertical portion 32b is coextensive with the horizontal portion 32a and is connected to the first and second arms 34, 35, respectively, spaced upwardly from their respective lower ends 34b, 35b, thereby stiffening the horizontal portion 32a and inhibiting bending or buckling thereof. When the gate 30 is in the guarded position, the vertical portion 32b of the gate face member 32 is positioned rearwardly from a rear surface of the punch 16 and spaced therefrom by a preselected distance, preferably ¼-inch.

A first mounting bracket 54 is fixedly secured to the first side end 13a of the ram 13. A first pivot bracket 53 is fixedly secured to an upper end 51 of a first activation cylinder 50 and is pivotably connected to the first mounting bracket 54 by a pin 55. The first activation cylinder 50 includes a first rod 52 reciprocally moveable therein between a retracted position (such as is shown in FIGS. 1 and 4) and an extended position (such as is shown in FIGS. 6 and 8). A distal end 52a of the first rod 52 is pivotably connected to a ram portion 34c of the first arm 34, and more particularly, at a position thereon located forwardly from the pivot point pin 38 and at substantially the same vertical position as the pivot point pin 38 when the gate 30 is in the guarded position. The first activation cylinder 50 is affixed at a location on the first side end 13a of the ram 13 relative to the ram portion 34c of the gate first arm 34 such that the gate 30 is in the guarded position when the first rod 52 is in the retracted position.

A second mounting bracket 64 is fixedly secured to the second side end 13b of the ram 13. A second pivot bracket 63 is fixedly secured to an upper end 61 of a second activation cylinder 60 and is pivotably connected to the second mounting bracket 64 by a pin 65. The second activation cylinder 60 includes a second rod 62 reciprocally moveable therein between a retracted position (such as is shown in FIGS. 1 and 5) and an extended position (such as is shown in FIGS. 6 and 9). A distal end 62a of the second rod 62 is pivotably connected to a ram portion 35c of the second arm 35, and more particularly, at a position thereon located forwardly from the pivot point pin 39 and at substantially the same vertical position as the pivot point pin 39 when the gate 30 is in the guarded position. The second activation cylinder 60 is affixed at a location on the second side end 13b of the ram 13 relative to the ram portion 35c of the gate second arm 35 such that the gate 30 is in the guarded position when the second rod 62 is in the retracted position.

Alternatively, the first and second activation cylinders 50, 60, respectively, may be replaced with an alternative means for pivoting the gate 30 between the guarded position and the retracted position. For example, a driven pinion gear (not shown) may be fixedly secured to the first and second arms 34, 35, respectively, coaxial with their respective pivot point pins 38, 39, which engages a driving gear (not shown) fixedly secured to reversible driving means, such as a reversible motor. The gate 30 is thereby pivoted between the guarded position and the retracted position by the reversible driving means rotating the driving gear (and rotating the driven pinion gear thereby) in the proper direction. Alternatively still, the driving gear may be replaced with a conventional, reciprocally-translatable toothed rack, which is connected to reciprocally-translatable driving means such as a two-directional cylinder, wherein the rack teeth engage the pinion gear teeth and cause the pinion gear to rotate thereby.

The first and second activation cylinders 50, 60, respectively, are each preferably a conventional two-stroke, single-bore pneumatic cylinder connected in any suitable, known manner to a pressurized air source, which permits powered movement of their respective rods 52, 62 therein in either a forward stroke direction or a reverse stroke direction. A control system 70 is provided as described hereinbelow by which pressurized movement of the first and second rods 52, 62, respectively, is controlled. Thus, the gate 30 can be maintained in either the guarded position or the retracted position.

With reference to FIGS. 6–9, and upon pressurization thereof, the first and second activation cylinders 50, 60, respectively, simultaneously extend downwardly to pivot the gate 30 from the guarded position (FIGS. 1–5) into the retracted position (FIGS. 6–9), such that the gate 30 is substantially away the path along which the ram 13 travels in the first direction "F" towards the lower frame 11, wherein movement of the gate 30 into the retracted position permits the frame die 14 to receive the ram punch 16 without obstruction from the gate 30. More particularly, as the first and second activation cylinder rods 52, 62, respectively, move downwardly towards their respective extended positions, the gate 30 pivots about the first and second pins 38, 39, respectively, away from the leading edge 17a of the punch projection 17 and into the retracted position. The ram 13 is thereby permitted to move into the second position, whereat the ram punch 16 is received by the die channel 15.

Extension of the first and second cylinder rods 52, 62, respectively, within their respective activation cylinders 50, 60, to pivot the gate 30 from the guarded position to the retracted position, and then from the retracted position back to the guarded position, is controlled by the control system 70 having an activator 71 fixedly secured to the ram 13 and extending over a portion of the upper frame 12 and in slidable relation thereto. The control system 70 further includes an activation switch 73 which is fixedly secured to the upper frame 12 and which is engageable with the activator 71 when the ram 13 is less than a predetermined activation distance from the lower frame 11. More particularly, the activator 71 and the activation switch 73 are relatively positioned such that the activator 71 engages the activation switch 73 only when the leading edge 17a of the die projection 17 is less than a predetermined distance from an uppermost portion of the die 14, that distance being preferably ¼-inch. Alternatively, the activator 71 may be fixedly secured to the upper frame 12 and the activation switch 73 may be fixedly secured to the ram 13.

The activation switch 73 is preferably a mechanical switch having an outwardly-biased, normally open lever 73a which is engageable with the activator 71 as described herein. The activator 71 physically depresses the lever 73a, thereby closing the activation switch 73 and activating the first and second activation cylinders 50, 60, respectively, as described herein. Alternatively, the activation switch 73 may be a magnetic proximity switch (not shown) or other similar switch which is capable of detecting the activator 71 when proximate thereto. Even further, any conventional switch apparatus may be used in place of the activator 71 and mechanical activation switch 73 herein described without departing from either the spirit or the scope of the present invention.

The activator 71 is preferably a narrow section of steel tubing having a rectangular cross-section and being fixedly secured, for example, by welding, to a front face 13c of the ram 13 such that the axis of the rectangular tubing is substantially perpendicular to the plane of the ram front face 13c. The activator 71 includes a sufficient height "h" so as to permit the activation switch 73 to remain in an activated state during the entire "forward stroke" of the ram 13, thereby maintaining the gate 30 in the retracted position during the entire "forward stroke" of the ram 13. That is, the gate 30 must pivot out from the guarded position and into the retracted position prior to the punch 16 being fully received by the die 14. Thus, the ram 13 must travel downwardly an additional preselected distance after the gate 30 pivots into the retracted position, during which time, the gate 30 must remain in the retracted position to prevent interference with the die 14.

Upper and lower conventional limit switches (not shown) are connected to the ram 13 (and to the reversible ram driving means) in any suitable, conventional manner to limit movement of the ram 13 in either the first or the second direction "F", "R", respectively, and to define the first and second positions thereof. After the ram 13 has moved through its complete "forward stroke" and is in the second position, the part has typically been formed. The ram 13 is then moved in the second direction "R" towards the first position so that the operator may remove the part therefrom. Once the ram 13 moves in the second direction "R" such that the punch 16 is more than the preselected activation distance from the die 14, the activator 71 no longer engages the activation switch 73, which then returns to its normally-deactivated state, at which point the reverse power stroke of the first and second cylinders 50, 60, respectively, moves the first and second rods 52, 62, respectively, upwardly, thereby pivoting the gate 30 back into the guarded position.

Figure 10:
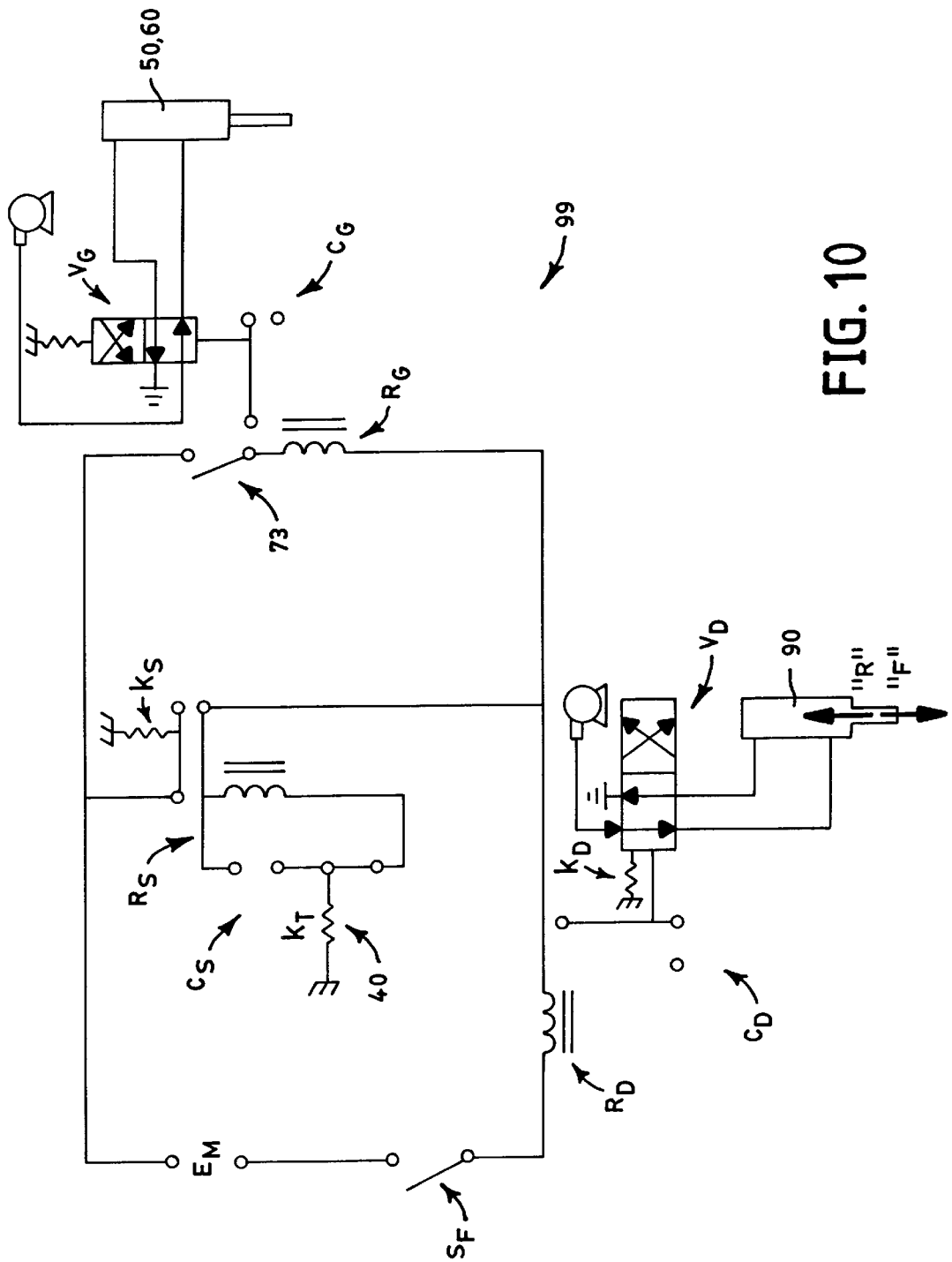
FIG. 10 is a schematic diagram of a press brake safety device control circuit according to a preferred embodiment of the present invention.

With reference to FIG. 10, the sensor 40 is connected to the reversible ram driving means 90 such that movement of the ram 13 in the first direction "F" is automatically suspended upon a first actuation of the sensor 40. Alternatively, movement of the ram 13 may automatically reverse to the second direction "R" upon a first actuation of the sensor 40. A conventional reset switch (not shown) may be provided which prevents movement of the ram 13 in the first direction "F" following a first actuation of the sensor 40 until the reset switch (not shown) is selected.

A control circuit 99 includes a main power source "$E_M$", a foot switch "$S_F$" and a driving means control "$C_D$" electrically connected in series to a safety control means "$C_S$". Foot switch "$S_F$" is preferably a 2-position, on-off switch, but may alternatively be a variable-position switch, such as a rheostat. A gate control "$C_G$" is electrically connected to the control circuit 99 in parallel to the safety control means "$C_S$". The driving means control "$C_D$" includes a relay "$R_D$" having an armature connected to a driving means solenoid valve "$V_D$", wherein the solenoid valve "$V_D$" provides pressurized hydraulic fluid to the ram driving means 90 to permit movement of the ram driving means 90 in either the first or the second direction "F", "R", respectively.

The foot switch "$S_F$" is normally open; thus, current normally does not flow from the main power source "$E_M$", through the relay "$R_D$". The solenoid valve "$V_D$", then, is normally in a first position shown in FIG. 10 due to the biasing spring "$k_D$", thereby supplying pressurized fluid to a portion of the ram driving means 90 which urges movement thereof in the second direction "R". However, closing the foot switch "$S_F$" causes current to flow from the maim power source "$E_M$", through the relay "$R_D$" (provided the safety control "$C_S$" is closed as described hereinbelow), thereby closing the armature of the relay "$R_D$" against the biasing spring "$k_D$" and moving the solenoid valve into a closed position, thereby supplying pressurized fluid to a portion of the ram driving means 90 which urges movement thereof in the first direction "F".

The safety control "$C_S$" includes a safety relay "$R_S$" connected in series to a safety power supply "$E_S$" and a normally-closed switch 40, preferably the tape switch 40 described hereinabove, which is biased by tape biasing spring "$k_T$" in a closed position shown in FIG. 10. The safety relay "$R_S$" includes an armature which is biased by tape biasing spring "$k_S$" in an open position shown in FIG. 10. To operate the ram driving means as described herein, switch 40 must be maintained in a closed position, whereby current is permitted to flow from the main power source "$E_M$", though the safety relay "$R_S$" and through the driving means relay "$R_D$" (provided the foot switch "$S_F$" is closed as described hereinabove). Upon opening the switch 40, for example, by depressing the tape switch 40 against biasing spring "$k_T$" as described hereinabove, the safety relay "$R_S$" switches to the normally-open position, whereby current is prevented from flowing from the main power source "$E_M$" and to the driving means relay "$R_D$". Thus, even if the foot switch "$S_F$" is depressed, the ram driving means 90 will move only in the second direction "R" if the safety relay "$R_S$" is opened, for example, by an operator's finger depressing the tape switch 40. Further, because the safety relay "$R_S$" is normally-open but closed only against biasing spring "$k_T$", switch 40 must be closed in order for current to flow to the driving means relay "$R_D$". Failure of the switch 40, for example, where the switch 40 is defective, will cause the safety relay "$R_S$" to remain open, thereby preventing movement of the ram driving means 90 in the first direction "F". Biasing spring "$k_T$" may be integral with the reset switch (not shown), in which case, switch 40 remains in an open position to prevent operation of the ram driving means.

With additional reference again to FIG. 4, the gate control "$C_G$" includes the activation switch 73 connected in series to a gate relay "$R_G$" having an armature connected to a gate solenoid valve "$V_G$", wherein the solenoid valve "$V_G$" provides pressurized air to the first and second activation cylinders 50, 60, respectively, to control movement of the gate 30 between the guarded and the retracted positions as described herein.

The activation switch 73 is normally open, thus the gate relay "$R_G$" is normally open and pressurized air is supplied to portions of the first and second activation cylinders 50, 60, respectively, which urges the gate 30 in the guarded position as described herein. However, upon closing the activation switch 73, for example, when the ram 13 has moved downwardly a sufficient distance to permit the activator 71 to engage the activation switch 73, the gate relay "$R_G$" closes, thereby moving the solenoid valve "$V_G$" into an open position, whereby pressurized air is supplied to portions of the first and second activation cylinders 50, 60, respectively, to urge and maintain the gate 30 in the retracted position. As long as the activation switch 73 is closed, current flows from the main power source "$E_M$", through the gate relay "$R_G$" and through the ram driving means relay "$R_D$", thereby urging the ram 13 in the first direction "F". Opening the safety relay "$R_S$", for example, by depressing the tape switch 40, does not materially affect the flow of current through the gate relay "$R_G$", to the driving means relay "$R_D$". Thus, once the activation switch 73 is closed, the gate 30 is pivoted into the retracted position as herein described and the tape switch 40 may be depressed without affecting further movement of the ram 13 in the first direction "F".

With reference to the Figures as indicated, operation of the press brake 10 and of the safety device 20 according to the preferred embodiment hereof is typically as follows. With the ram 13 in the first position (FIG. 1), the first and second activation cylinders 50, 60, respectively, are pressurized such that their respective first and second cylinder rods 52, 62, are extended, thereby positioning the gate 30 in the guarded position (FIG. 3). The operator manually positions and holds a part to be formed by the press brake 10, for example, the planar strip of formable material, between the punch 17 and the die 14, and preferably rests the formable material directly on uppermost portions of the die 14.

The operator depresses the foot switch "$S_F$", which activates forward motion of the ram 13 in the first direction "F" towards the lower frame 11. During such forward motion, the gate 30 remains in the guarded position until the distance between the punch 16 and the die 14 is equal to the preselected activation distance. As stated above, the preselected activation distance is preferably less than the thickness of the smallest finger of an average-sized and proportioned operator but is greater than the thickness of the formable material. Thus, a foreign object, such as the operator's hand or finger, which has been placed in the path along which the ram 13 travels towards the lower frame 11 will contact the gate 30, and more particularly, the sensor 40 affixed to an underside surface of the gate 30, prior to the gate's moving into the retracted position (FIG. 7). Actuation of the sensor 40 while the gate 30 is in the guarded position (FIG. 3) will automatically suspend forward movement of the ram 13 in the "F" direction towards the lower frame 11, and may automatically reverse movement of the ram 13 from the first direction "F" towards the lower frame 11 to the second direction "R" away from the lower frame 11. The operator may be required to select a reset switch (not shown) before operation of the press brake 10 may resume. However, the gate 30, if not obstructed by a foreign object prior to reaching the preselected actuation distance, will pivot into the retracted position prior to engaging the formable material.

Once the ram 13 reaches the preselected activation distance, provided the sensor 40 has not been actuated, the activator 71 (FIG. 8) engages the activation switch 73, thereby reversing the supply of pressurized air from the underside of the pistons (not shown) within each of the activation cylinder bores (not shown) to the upperside of the pistons (not shown). Each cylinder rod 52, 62 is thus translated downwardly within its respective cylinder bore, thereby pivoting the gate 30 from the guarded position (FIG. 3) and into the retracted position (FIG. 7). Further forward movement of the ram 13 in the first direction "F" may continue without obstruction from the gate 30, which is maintained in the retracted position by a constant pressurized source due to the constant activation of the activation switch 73 by the activator 71 while the distance between the punch 16 and the die 14 are less than the preselected activation distance. The punch 16 is thereby permitted to engage the formable material, forcing it into the die 14, and forming the desired part thereby.

Once the ram 13 has reached the second position, the reversible ram driving means (not shown) automatically reverses movement of the ram 13 in the second direction "R" until the ram 13 returns to the first position, at which point sufficient distance is provided between the punch 16 and the die 14 to permit the operator to remove the formed part therefrom. As soon as movement of the ram 13 in the second direction "R" results in the distance between the punch 16 and the die 14 being greater than the preselected activation distance, the activator 71 no longer engages the activation switch 73, thereby reversing the supply of pressurized air from the upper side of the pistons (not shown) within its respective cylinder bore (not shown) to the underside of the pistons (not shown). Each cylinder rod 52, 62 is thus translated upwardly within its respective cylinder bore, thereby pivoting the gate 30 from the retracted position (FIG. 7) and back into the guarded position (FIG. 3). At all times during which the gate 30 is in the retracted position, the gate control "$C_G$" supplies current from the maul power source "$E_M$" to the ram driving means control "$C_D$", regardless of the position of the switch 40 or safety control relay "$R_S$". Thus, once the ram 13 reaches the preselected actuation distance, movement of the ram 13 in the first direction "F" will not be interrupted by depressing the tape switch 40.

With reference to FIGS. 11 and 12, a safety device 120 according to an alternative embodiment of the present invention is shown affixed to the press brake 10 hereinabove described. The safety device 120 according to the present invention includes many components in common with the safety device 20 according to the preferred embodiment hereof hereinabove described and like reference numerals are intended to represent like components. However, the safety device 120 according to the present embodiment further includes first and second adjuster plates 156, 166, respectively, wherein the first adjuster plate 156 is adjustably affixed to the first side end 13a of the ram 13 and the second adjuster plate 166 is adjustably affixed to the second side end 13b of the ram 13.

More particularly, and with specific reference to FIG. 11, the first adjuster plate 156 includes at least one slot 157 therein, and preferably at least two slots 157 therein, substantially vertically aligned with the path along which the ram 13 travels in moving towards the lower frame 11 in the first and second directions "F", "R", respectively. A tightening bolt 157a is provided for each slot 157 to threadingly engage a threaded bore (not shown) provided in the first side end 13a of the ram 13 adjacent the slot 157. The first adjuster plate 156 is thereby vertically positionable on the first side end 13a of the ram by loosening the tightening bolt 157a, sliding the first adjuster plate 156 upwardly or downwardly along the slot 157 into the desired position, and tightening the tightening bolt 157a, thereby locking the first adjuster plate 156 in the desired position and preventing movement thereof without the operator's first loosening the tightening bolt 157a.

With specific reference now to FIG. 12, the second adjuster plate 166 includes at least one slot 167 therein, and preferably at least two slots 167 therein, substantially vertically aligned with the path along which the ram 13 travels in moving towards the lower frame 11 in the first and second directions "F", "R", respectively. A tightening bolt 167a is provided for each slot 167 to threadingly engage a threaded bore (not shown) provided in the second side end 13b of the ram 13 adjacent the slot 167. The second adjuster plate 166 is thereby vertically positionable on the second side end 13b of the ram by loosening the tightening bolt 167a, sliding the second adjuster plate 166 along the slot 167 into the desired position, and tightening the tightening bolt 167a, thereby locking the second adjuster plate 166 in the desired position and preventing movement thereof without the operator's first loosening the tightening bolt 167a.

With reference again to both FIGS. 11 and 12, the first and second mounting blocks 54, 64, respectively, and the first and second arms 34, 35, respectively, are each affixed to the first and second adjuster plates 156, 166, respectively, rather than directly to the first and second side ends 13a, 13b, respectively, of the ram 13 as in the preferred embodiment hereof hereinabove described. However, the first and second mounting blocks 54, 64, respectively, and the first and second arms 34, 35, respectively, are each affixed to the first and second adjuster plates 156, 166, respectively, in the same manner as they were affixed to the first and second side ends 13a, 13b, respectively, of the ram 13 in the preferred embodiment hereof hereinabove described. That is, the first and second mounting blocks 54, 64, respectively, are each fixedly secured to their respective adjuster plate 156, 166, and the first and second arms 34, 35, respectively, are each pivotably connected to their respective adjuster plate 156, 166. First and second adjuster plates 156, 166, respectively, then, permit vertical adjustment and positioning of the gate facing member 32 relative to the lowermost end of the ram 13, to which the mounting plate 16a is affixed, without affecting the pivotable movement of the gate 30. Punches 16 having varying heights "$h_P$" (FIG. 3) may then be used with the safety device 120 according to the present embodiment while requiring only minor adjustment to the first and second adjuster plates 156, 166, respectively, to provide the aforementioned preferred ¼-inch spacing between the gate facing member 32 and the leading edge 17a of the punch 16.

The activation switch 73 is fixedly secured to a third adjuster plate 174, which is adjustably mounted to the front face of the upper frame 12. The third adjuster plate 174 includes at least one slot 174a therein and a tightening bolt 174b which is threadingly received through the slot 174 and within a threaded bore (not shown) provided in the front face of the upper frame 12. The aforementioned activation distance can thus be adjusted, for example, when an operator exchanges an existing punch 16 with another punch 16 having a different height "$H_P$".

Figure 14:
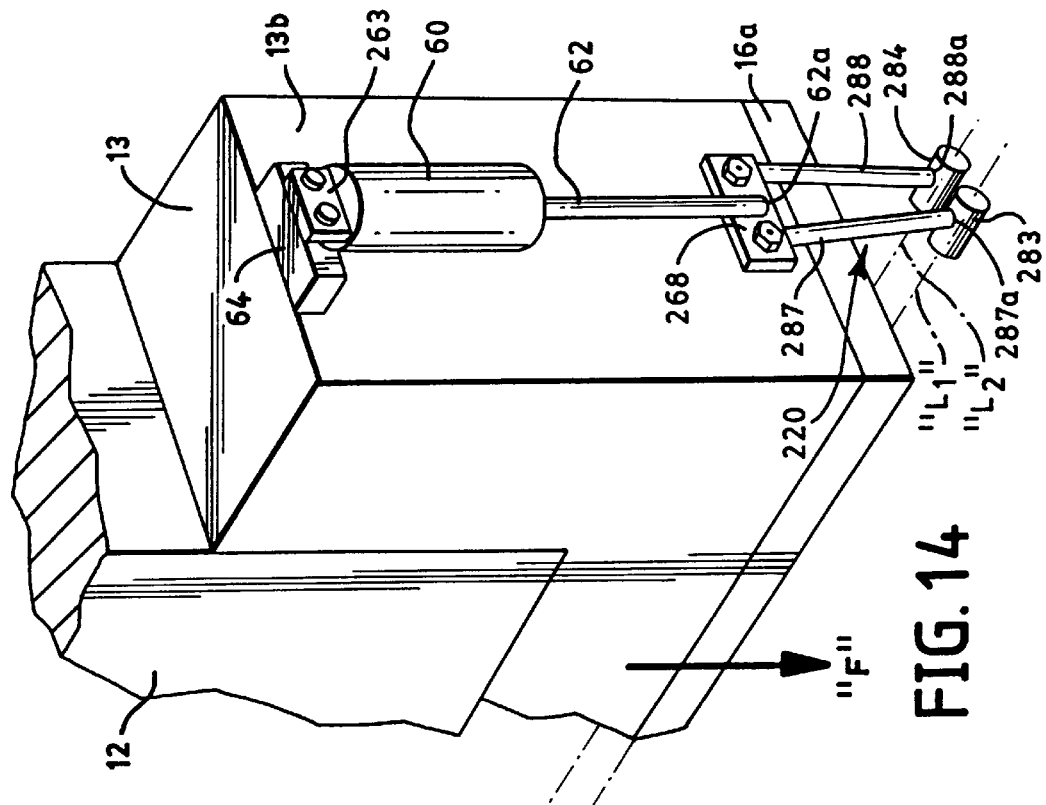
FIG. 14 is a detail perspective view of the press brake and safety device of FIG. 13, wherein a second side end of the press brake is shown.
Figure 13:
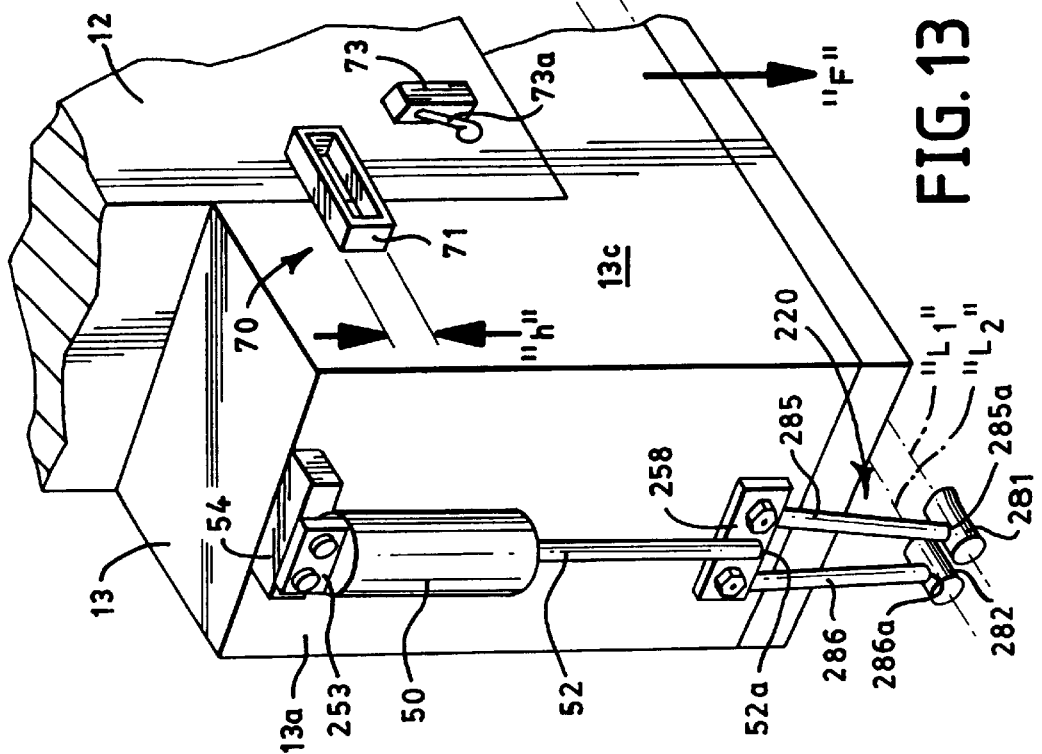
FIG. 13 is a detail perspective view of the press brake of FIG. 1, shown with a safety device according to another alternative embodiment of the present invention shown affixed thereto, wherein a first side end of the press brake is shown.

With reference to FIGS. 13 and 14, a safety device 220 according to another alternative embodiment of the present invention is shown affixed to the press brake 10 hereinabove described. The safety device 220 according to the present embodiment includes many components in common with the safety device 20 according to the preferred embodiment hereof hereinabove described and like reference numerals are intended to represent like components. However, the safety device 220 according to the present embodiment includes first and second light beams "$L_1$", "$L_2$", respectively, generated by first and second conventional light projectors 281, 282, respectively, and detected by first and second conventional light receivers 283, 284, respectively. First and second light projectors 281, 282, respectively, and first and second light receivers 283, 284, respectively, are electrically connected to a power source (not shown) in any conventional manner to permit detection of an object placed between either first light projector 81 and first light receiver 83 which interrupts first light beam "$L_1$", or between second light projector 82 and second light receiver 84 which interrupts second light beam "$L_2$".

Figure 16:
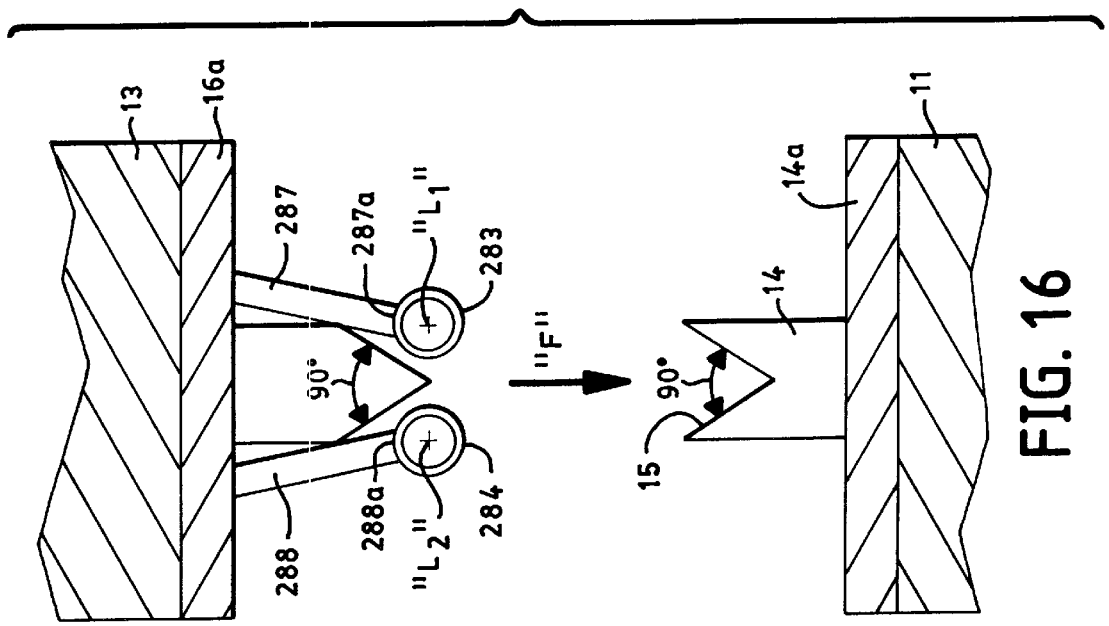
FIG. 16 is a section view of the press brake and safety device of FIG. 13, shown along section line 16—16 of FIG. 15.

First and second light beams "$L_1$", "$L_2$", respectively, pass transversely vertically beneath the ram 13 and are spaced vertically below the leading edge 17a of the punch 16 by approximately ¼-inch, or slightly less than the thickness of the smallest finger of an average-sized and proportioned operator. First light beam "$L_1$" is preferably spaced forwardly of the punch 16, and second light beam "$L_2$" is preferably spaced rearwardly of the punch 16. The first and second light beams "$L_1$", "$L_2$", respectively, then, surround the leading edge 17a of the punch 16, which forms a pinch-point with the die 14 (FIG. 16).

A first mounting bracket 54 is fixedly secured to the first side end 13a of the ram 13. A first activation cylinder 50 is fixedly secured to the first mounting bracket 54, for example, by bolting a first cylinder bracket 253 (which is fixedly secured to an upper end of the first activation cylinder 50) to the first mounting bracket 54. The first activation cylinder 50 includes a first rod 52 reciprocally moveable therein between a retracted position (such as is shown in FIG. 17) and an extended position (such as is shown in FIG. 13). A first plate 258 is fixedly secured, for example, by welding, to a distal end 52a of the first rod 52 and extends forewardly and rearwardly therefrom.

A first projector arm 285 is pivotably connected to a forward portion of the first plate 258; the first light projector 281 is fixedly secured to a lower end 285a of the first projector arm 285. A second projector arm 286 is pivotably connected to a rearward portion of the first plate 258; the second light projector 282 is fixedly secured to a lower end 286a of the second projector arm 286.

A second mounting bracket 64 is fixedly secured to the second side end 13b of the ram 13. A second activation cylinder 60 is fixedly secured to the second mounting bracket 64, for example, by bolting a second cylinder bracket 263 (which is fixedly secured to an upper end of the second activation cylinder 60) to the second mounting bracket 64. The second activation cylinder 60 includes a second rod 62 reciprocally moveable therein between a retracted position (such as is shown in FIG. 18) and an extended position (such as is shown in FIG. 14). A second plate 268 is fixedly secured, for example, by welding, to a distal end 62a of the second rod 62 and extends forewardly and rearwardly therefrom.

A first receiver arm 287 is pivotably connected to a forward portion of the second plate 268; the first light receiver 283 is fixedly secured to a lower end 287a of the first receiver arm 287. A second receiver arm 288 is pivotably connected to a rearward portion of the second plate 268; the second light receiver 284 is fixedly secured to a lower end 288a of the second receiver arm 288.

Figure 15:
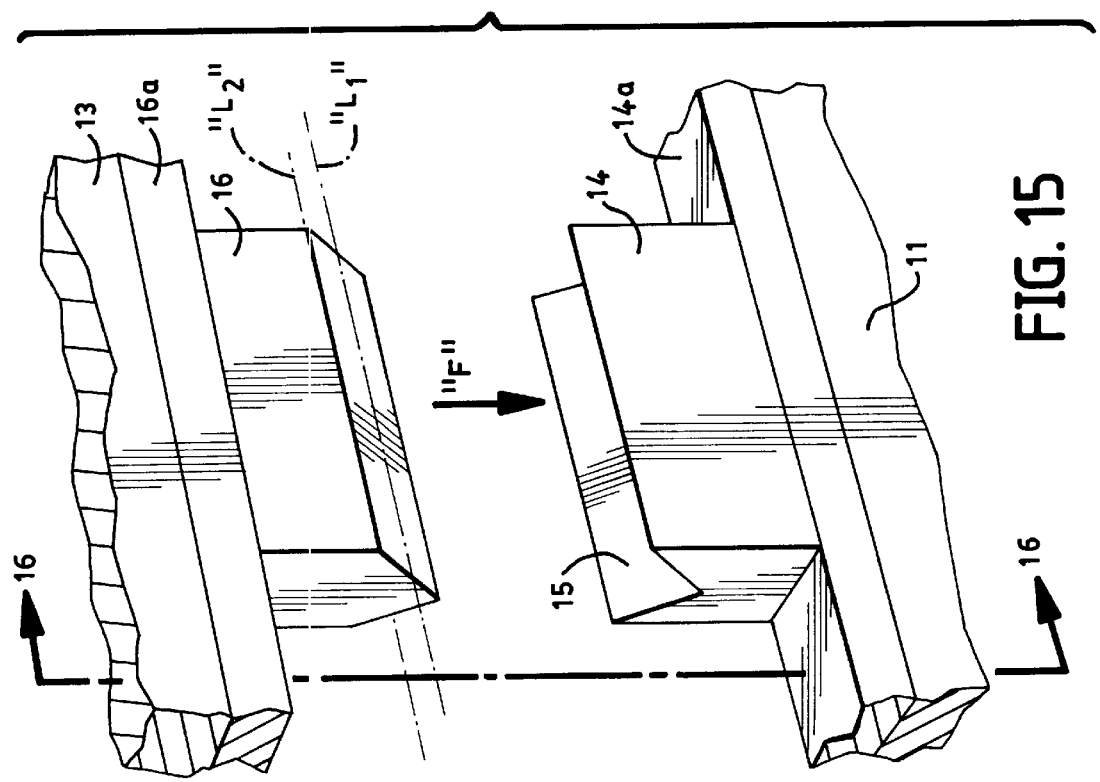
FIG. 15 is a detail perspective view of the press brake and safety device of FIG. 13, wherein a region surrounding a pinch point thereof is shown.

With additional reference to FIGS. 15 and 16, the light beams "$L_1$", "$L_2$" pass from the light projectors 281, 282, respectively, to the light receivers 283, 284, respectively, and surround the punch 16 so as to prevent an object from contacting the punch 16 without interrupting either or both of the light beams "$L_1$", "$L_2$", under ordinary operating conditions. The vertical position of the light beams "$L_1$", "$L_2$", relative to the leading edge 17a of the punch 16 can be adjusted, for example, to accommodate punches 16 having varying heights ("$h_P$" (FIG. 3). Moreover, the horizontal position of the light beams "$L_1$", "$L_2$", relative to the punch 16 can be adjusted by pivoting the arms 285, 286 and 287, 288 about the first and second plates 258, 268, respectively. Under ordinary operating conditions, the light beams "$L_1$", "$L_2$" move integrally with the ram 13 in the first and second directions "F", "R", respectively. Interruption of either light beam "$L_1$", "$L_2$" automatically suspends movement of the ram 13 in the first direction "F" as described hereinabove with reference to the preferred embodiment hereof, and may alternatively, reverse the direction of movement of the ram 13 to the second direction "R".

Once the punch 16 is less than the predetermined actuation distance from the die 14, the rods 52, 62 of the first and second activation cylinders 50, 60, respectively, retract, thereby lifting the light beams "$L_1$", "$L_2$" upwardly towards the punch 16. To prevent the punch 16 from interrupting the light beams "$L_1$", "$L_2$", the light beams "$L_1$", "$L_2$" are shut off as soon as the punch 16 is less than the predetermined actuation distance from the die 14. Because the arms 285, 286 and 287, 288 move upwardly alongside the ram side ends 13a, 13b, the arms 285, 286 and 287, 288, the light projectors 281, 282 and the light receivers 283, 284 do not obstruct an oversized part which may be formed in the press brake 10 and which must extend transversely beyond the side ends 13a, 13b of the ram 13.

Alternatively, the actuation cylinders 50, 60 may pivot the arms 285, 286 and 287, 288 outwardly away from the punch 16 as described hereinabove with respect to the preferred embodiment hereof. In yet another alternative embodiment of the present invention, first and second light beams "$L_1$", "$L_2$", respectively, are replaced by a single light beam which passes vertically below the leading edge of the punch. In still yet another alternative embodiment of the present invention, three or more light beams may be provided to form a "light curtain" vertically below the leading edge of the punch.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the disclosure. Accordingly, modifications are contemplated which can be made without departing from either the spirit or the scope of the present invention as described hereinabove.

I claim:

1. In a press brake for forming a part between a die mounted on a frame of said press brake and a punch mounted on a moveable ram of said press brake, the improvement comprising a safety device including:

a gate mounted to said ram, said gate being moveable between a guarded position and a retracted position, said gate being in said retracted position when said punch is less than a preselected distance from said die, said gate being interposed between said punch and said die when said gate is in said guarded position; and, a sensor operatively connected to said press brake to suspend operation of said press brake upon actuation of said sensor when said gate is in said guarded position.

2. The safety device according to claim 1, said gate including:

an elongated face member, said sensor being mounted to said face member;

a first arm having an upper end thereof pivotably connected to said ram and a lower end thereof attached to said face member; and, a second arm having an upper end thereof pivotably connected to said ram and a lower end thereof attached to said face member.

3. The safety device according to claim 1, said safety device further including means to pivot said gate between said guarded position and said retracted position.

4. The safety device according to claim 1, said safety device further including means to translate said gate between said guarded position and said retracted position.

5. The safety device according to claim 1, said sensor being a contact-sensitive tape switch.

6. The safety device according to claim 1, further including:

an activator attached to said ram; and, an activation switch attached to said frame, wherein said activator engages said activation switch when said punch is less than said preselected distance from said die.

7. The safety device according to claim 1, said gate including:

at least one first arm slidably connected to said ram;

at least one second arm slidable connected to said ram;

at least one light projector connected to said at least one first arm;

at least one light receiver connected to said at least one second arm, said punch being interposed between said at least one light projector and said at least one light receiver when said gate is in said guarded position; and, at least one beam of light being transmitted from said at least one light projector to said at least one light receiver.

8. The safety device according to claim 3, said gate pivoting means including at least one piston-and-cylinder assembly, said at least one piston-and-cylinder assembly having a cylinder housing connected to said ram and a rod reciprocally mounted to said cylinder housing, said rod being moveable between an extended position and a retracted position, said rod having a distal end thereof connected to said gate.

9. The safety device according to claim 7, said sensor being operatively engaged with said at least one light receiver to detect an object in the path of said at least one beam of light.

10. A press brake, comprising:

an immobile frame having a die mounted thereto;

a moveable ram having a punch mounted thereto;

reversible driving means for moving said ram between a first position and a second position;

a gate mounted to said ram, said gate being moveable between a guarded position and a retracted position, said gate being in said retracted position when said punch is less than a preselected distance from said die; and, a sensor operatively connected to said press brake to suspend operation of said press brake upon actuation of said sensor when said gate is in said guarded position, said gate being interposed between said punch and said die when said gate is in said guarded position.

11. The press brake according to claim 10, said gate including:

an elongated face member, said sensor being mounted to said face member;

a first arm having an upper end thereof pivotably connected to said ram and a lower end thereof attached to said face member near a first distal end thereof; and, a second arm having an upper end thereof pivotably connected to said ram and a lower end thereof attached to said face member near a second distal end thereof.

12. The press brake according to claim 10, said safety device further including means to pivot said gate between said guarded position and said retracted position.

13. The safety device according to claim 10, said safety device further including means to translate said gate between said guarded position and said retracted position.

14. The press brake according to claim 10, said sensor being a contact-sensitive tape switch.

15. The press brake according to claim 10, further including:

an activator attached to said ram; and, an activation switch attached to said frame, wherein said activator engages said activation switch when said punch is less than said preselected distance from said die.

16. The safety device according to claim 10, said gate including:

at least one first arm slidably connected to said ram;

at least one second arm slidable connected to said ram;

at least one light projector connected to said at least one first arm;

at least one light receiver connected to said at least one second arm, said punch being interposed between said at least one light projector and said at least one light receiver when said gate is in said guarded position; and, at least one beam of light being transmitted from said at least one light projector to said at least one light receiver.

17. The safety device according to claim 10, said sensor being operatively engaged with said at least one light receiver to detect an object in the path of said at least one beam of light.

18. The press brake according to claim 12, said gate pivoting means including at least one piston-and-cylinder assembly, said at least one piston-and-cylinder assembly having a cylinder housing connected to said ram and a rod reciprocally mounted to said cylinder housing, said rod being moveable between an extended position and a retracted position, said rod having a distal end thereof connected to said gate.

* * * * *